US012602896B2

(12) United States Patent     (10) Patent No.:   US 12,602,896 B2

Ito     (45) Date of Patent:    Apr. 14, 2026

(54) IMAGE PROCESSING DEVICE, IMAGE PROCESSING METHOD, AND STORAGE MEDIUM

(71) Applicant: CASIO COMPUTER CO., LTD., Tokyo (JP)

(72) Inventor: Takuma Ito, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 322 days.

(21) Appl. No.: 18/447,647

(22) Filed: Aug. 10, 2023

(65) Prior Publication Data

US 2024/0054750 A1     Feb. 15, 2024

(30) Foreign Application Priority Data

Aug. 10, 2022    (JP) ................................. 2022-127807

(51) Int. Cl.
   *G06V 10/25*      (2022.01)
   *G06T 7/70*      (2017.01)
   *G06V 20/52*      (2022.01)

(52) U.S. Cl.
   CPC ................ *G06V 10/25* (2022.01); *G06T 7/70* (2017.01); *G06V 20/52* (2022.01); *G06V 2201/07* (2022.01)

(58) Field of Classification Search
   CPC .... G06V 10/25; G06V 20/52; G06V 2201/07; G06V 10/62; G06T 7/70
   See application file for complete search history.

(56) References Cited

U.S. PATENT DOCUMENTS

| | | | |
|---|---|---|---|
| 10,838,056 B1 * | 11/2020 | Cai | G01S 13/50 |
| 2008/0002028 A1 * | 1/2008 | Miyata | H04N 23/635 |
| | | | 348/169 |
| 2010/0321503 A1 * | 12/2010 | Sakata | H04N 23/634 |
| | | | 348/169 |
| 2012/0274780 A1 * | 11/2012 | Yamamoto | H04N 23/631 |
| | | | 348/333.12 |
| 2016/0335489 A1 * | 11/2016 | Shigemura | G06V 40/103 |
| 2023/0245323 A1 * | 8/2023 | Araki | G06T 7/70 |
| | | | 382/103 |

FOREIGN PATENT DOCUMENTS

| | | |
|---|---|---|
| JP | 2005109814 A | 4/2005 |
| JP | 2012029245 A | 2/2012 |
| JP | 2015111939 A | 6/2015 |
| JP | 2016016984 A | 2/2016 |

OTHER PUBLICATIONS

Notice of Reasons for Refusal dated Jul. 16, 2024 received in Japanese Patent Application No. 2022-127807.

* cited by examiner

*Primary Examiner* — Chan S Park
*Assistant Examiner* — Chandhana Pedapati
(74) *Attorney, Agent, or Firm* — Scully, Scott, Murphy & Presser, P.C.

(57) ABSTRACT

An image processing device including a processing unit, in which
   in a position in a central part of a frame image region related to a plurality of frame images, an output target region smaller than the frame image region is set as a range for which image data is output, and
   an out-of-frame monitor region to be a target for detecting a subject is set in a position deviated in a predetermined direction from the central part, in a part of the frame image region outside the output target region.

17 Claims, 8 Drawing Sheets

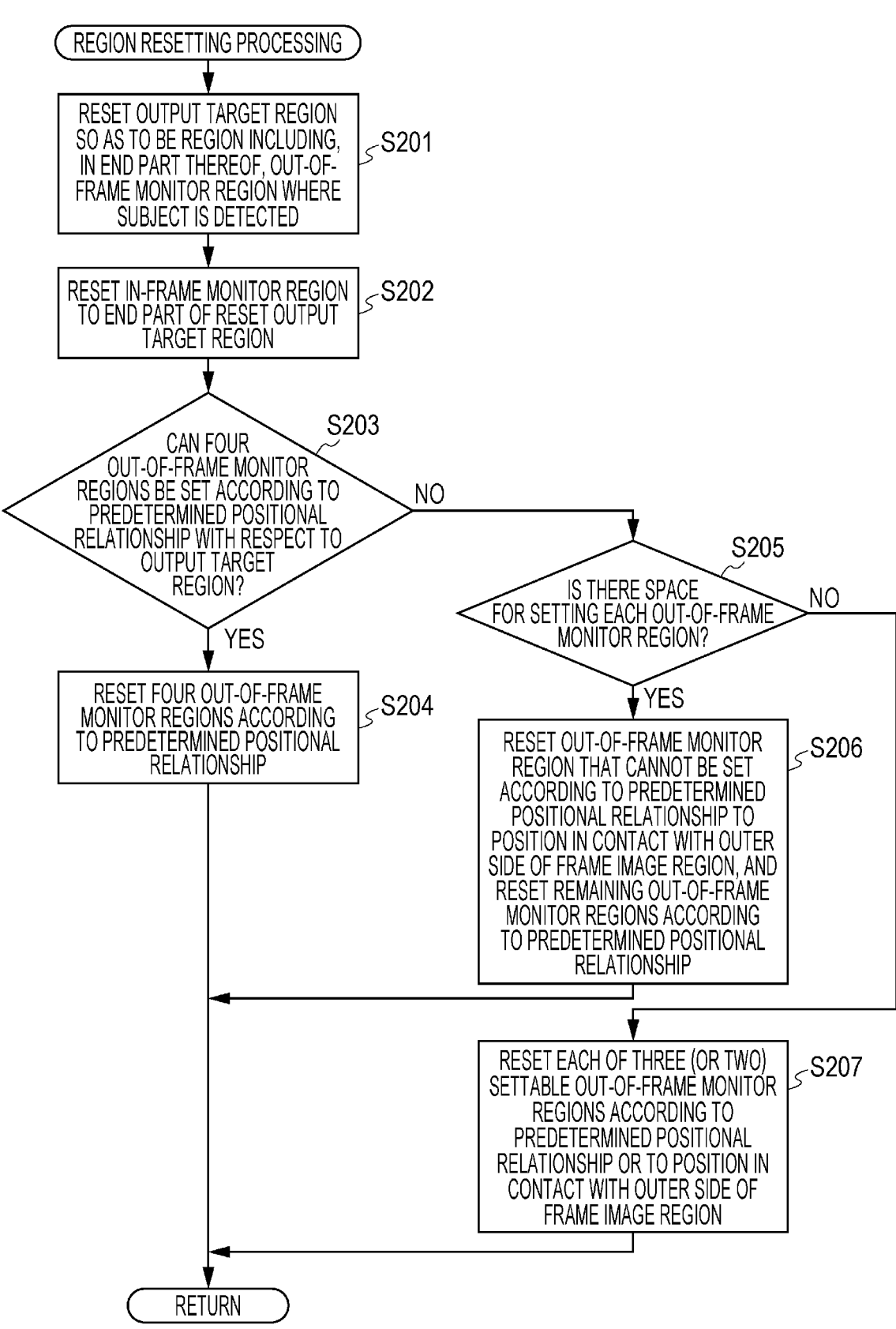

REGION RESETTING PROCESSING

RESET OUTPUT TARGET REGION SO AS TO BE REGION INCLUDING, IN END PART THEREOF, OUT-OF-FRAME MONITOR REGION WHERE SUBJECT IS DETECTED — S201

RESET IN-FRAME MONITOR REGION TO END PART OF RESET OUTPUT TARGET REGION — S202

S203 CAN FOUR OUT-OF-FRAME MONITOR REGIONS BE SET ACCORDING TO PREDETERMINED POSITIONAL RELATIONSHIP WITH RESPECT TO OUTPUT TARGET REGION?

NO

YES

RESET FOUR OUT-OF-FRAME MONITOR REGIONS ACCORDING TO PREDETERMINED POSITIONAL RELATIONSHIP — S204

S205 IS THERE SPACE FOR SETTING EACH OUT-OF-FRAME MONITOR REGION?

NO

YES

RESET OUT-OF-FRAME MONITOR REGION THAT CANNOT BE SET ACCORDING TO PREDETERMINED POSITIONAL RELATIONSHIP TO POSITION IN CONTACT WITH OUTER SIDE OF FRAME IMAGE REGION, AND RESET REMAINING OUT-OF-FRAME MONITOR REGIONS ACCORDING TO PREDETERMINED POSITIONAL RELATIONSHIP — S206

RESET EACH OF THREE (OR TWO) SETTABLE OUT-OF-FRAME MONITOR REGIONS ACCORDING TO PREDETERMINED POSITIONAL RELATIONSHIP OR TO POSITION IN CONTACT WITH OUTER SIDE OF FRAME IMAGE REGION — S207

RETURN

IMAGE PROCESSING DEVICE, IMAGE PROCESSING METHOD, AND STORAGE MEDIUM

CROSS-REFERENCE TO RELATED APPLICATIONS

This application claims priority to and the benefit of JP 2022-127807 A filed on Aug. 10, 2022. The entire specification, claims, and drawings of JP 2022-127807 A are incorporated herein by reference.

BACKGROUND

1. Technical Field

The present disclosure relates to an image processing device, an image processing method, and a storage medium.

2. Related Art

Conventionally, various techniques for tracking a subject detected in a dynamic image including a plurality of frame images have been proposed. For example, JP 2012-29245 A discloses a technique in which a subject is imaged by two imaging units having different angles of view, and in a case where the subject deviates from the angle of view of one imaging unit, the subject is detected in the imaging range of the other imaging unit capable of performing imaging at a wider angle, and notification information related to the position of the subject is output.

SUMMARY

An image processing device according to the present disclosure includes a processing unit, and the processing unit is configured to:

set, as a range for which image data is output, in a position in a central part of a frame image region related to a plurality of frame images, an output target region smaller than the frame image region; and set an out-of-frame monitor region to be a target for detecting a subject in a position deviated in a predetermined direction from the central part, in a part of the frame image region outside the output target region.

An image processing method executed by a computer of an image processing device according to the present disclosure includes the steps of setting, as a range for which image data is output, in a position in a central part of a frame image region related to a plurality of frame images, an output target region smaller than the frame image region, and setting an out-of-frame monitor region to be a target for detecting a subject in a position deviated in a predetermined direction from the central part, in a part of the frame image region outside the output target region.

A non-transitory computer-readable storage medium stores a program according to the present disclosure, the program causing a computer of an image processing device to execute processing of setting, as a range for which image data is output, in a position in a central part of a frame image region related to a plurality of frame images, an output target region smaller than the frame image region, and processing of setting an out-of-frame monitor region to be a target for detecting a subject in a position deviated in a predetermined direction from the central part, in a part of the frame image region outside the output target region.

BRIEF DESCRIPTION OF THE DRAWINGS

FIG. 1 is a block diagram illustrating a functional configuration of an electronic device;

FIG. 11 is a flowchart illustrating a control procedure of region resetting processing.

DETAILED DESCRIPTION

Figures 2, 3:
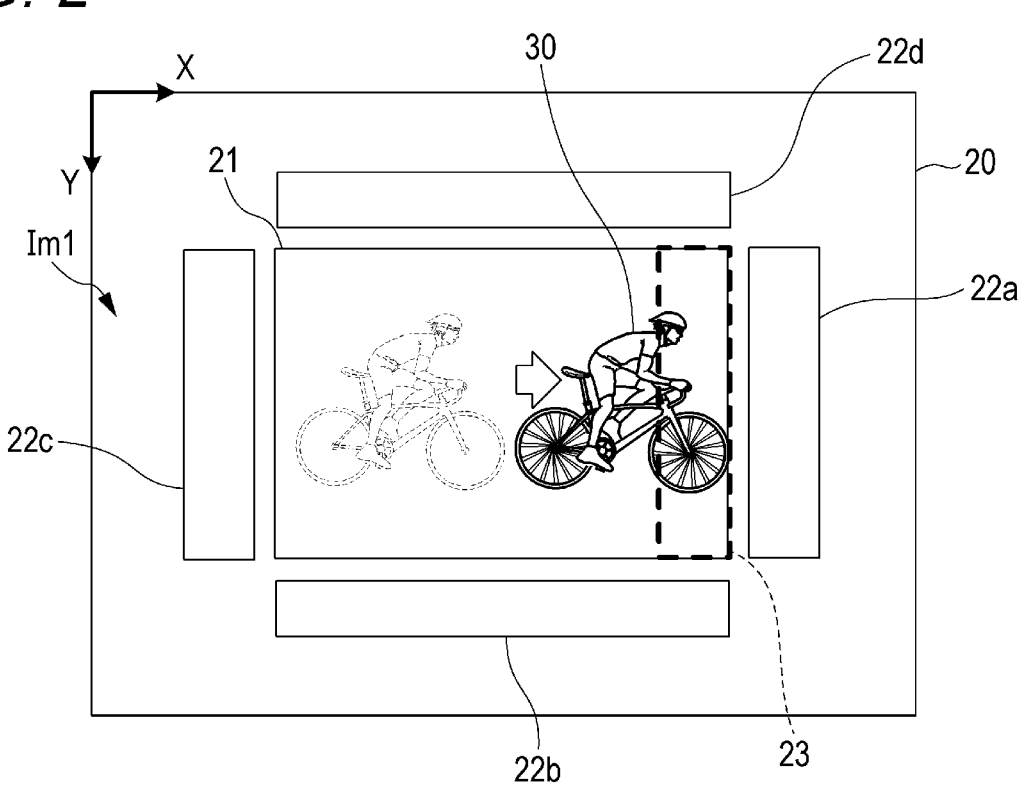
FIG. 2 is a diagram illustrating a frame image region related to a plurality of frame images captured by an imaging unit.
FIG. 3 is a diagram illustrating a frame image region when a subject is detected in an out-of-frame monitor region.

Hereinafter, an embodiment of the present disclosure will be described with reference to the drawings.

<Configuration of Electronic Device 1>

Figure 1:
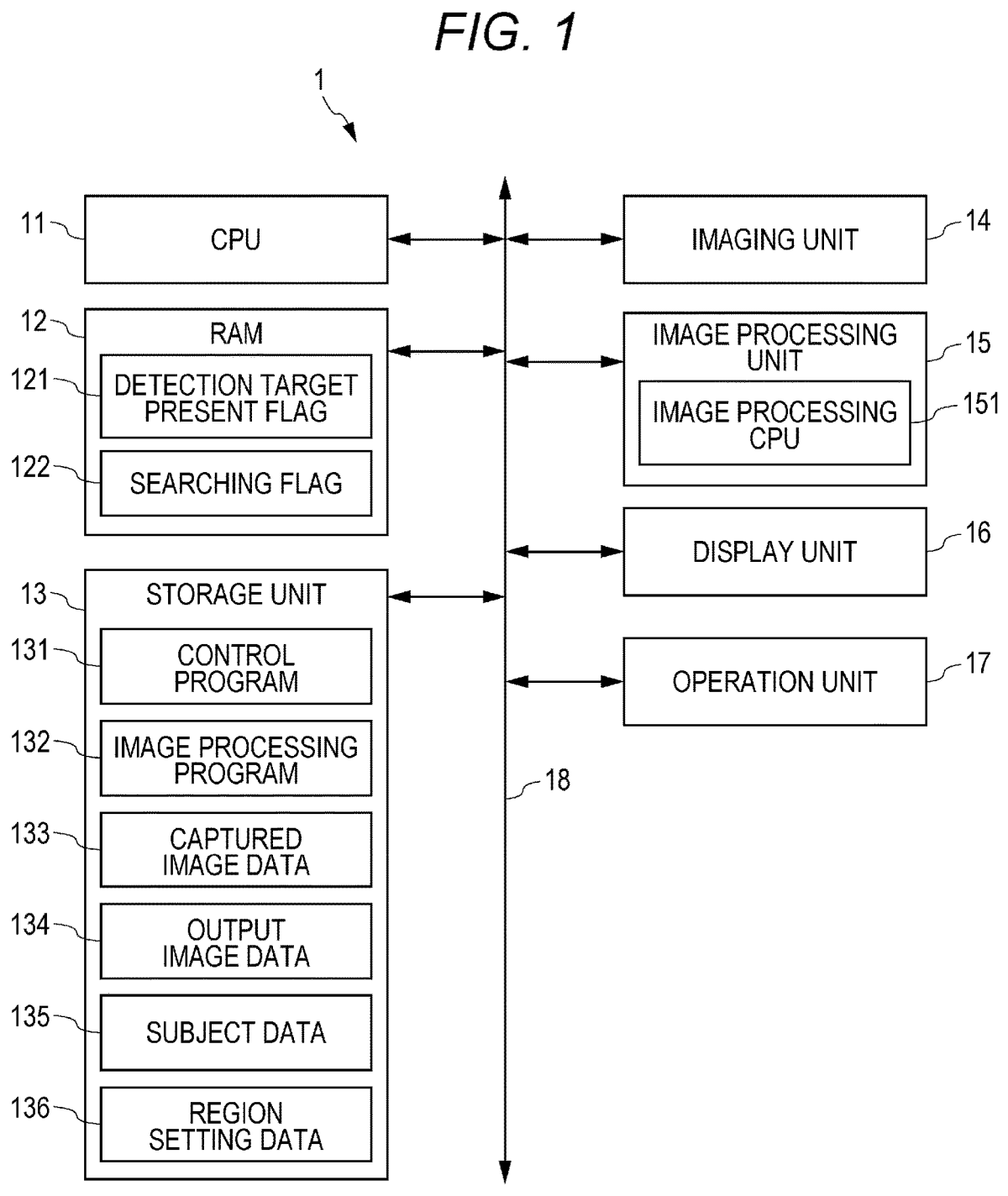

FIG. 1 is a block diagram illustrating a functional configuration of an electronic device 1 according to the present embodiment.

The electronic device 1 (image processing device) includes at least one processor such as a central processing unit (CPU) 11, a random access memory (RAM) 12 as at least one memory, a storage unit 13, an imaging unit 14, an image processing unit 15 including an image processing CPU 151 (digital signal processor), a display unit 16, an operation unit 17, a bus 18, and the like. Each unit of the electronic device 1 is connected via a bus 18. The electronic device 1 of the present embodiment is, for example, a smartphone capable of capturing a moving image and a still image by the imaging unit 14. Note, however, that the electronic device 1 is not limited thereto, and may be another device capable of capturing a moving image, such as a tablet terminal, a digital camera, a video camera, a notebook PC, a stationary PC, and a drive recorder.

The CPU 11 is a processor that controls the operation of the electronic device 1 by reading and executing a control program 131 stored in the storage unit 13 and performing various types of arithmetic processing. Note that the electronic device 1 may include a plurality of processors (e.g., a plurality of CPUs), and the plurality of processors may execute a plurality of processes executed by the CPU 11 of the present embodiment. In this case, the plurality of processors may be involved in a common process, or the plurality of processors may independently execute different processes in parallel.

The RAM 12 provides the CPU 11 with a working memory space and stores temporary data. The RAM 12 stores a detection target present flag 121 and a searching flag 122 which are referred to in subject tracking processing to be described later. The detection target present flag 121 and the searching flag 122 are 1-bit data that can take two values of "1 (on)" and "0 (off)".

The storage unit 13 is a non-transitory recording medium readable by the CPU 11 and the image processing CPU 151 as a computer, and stores the control program 131, an image processing program 132, and various types of data. The storage unit 13 includes, for example, a non-volatile memory such as a flash memory. The control program 131 and the image processing program 132 are stored in the storage unit 13 in the form of a computer-readable program code. Data stored in the storage unit 13 includes captured image data 133, output image data 134, subject data 135, region setting data 136, and the like. The contents of these pieces of data will be described later.

The imaging unit 14 includes a camera including an optical system that forms an image of incident light and an imaging element that detects the incident light formed by the optical system, and generates the captured image data 133 related to an image captured by the camera on the basis of a detection signal output from the imaging element of the camera. The optical system includes, for example, a mirror and a lens group. The imaging element is not particularly limited as long as it can photoelectrically convert incident light, and for example, a charge coupled device (CCD), a complementary metal oxide semiconductor (CMOS), or the like can be used.

The imaging unit 14 amplifies the detection signal from the imaging element and performs A/D conversion to generate the captured image data 133. Furthermore, the imaging unit 14 captures a plurality of frame images related to a moving image (dynamic image) at a frame rate according to the control by the CPU 11, and generates a plurality of pieces of the captured image data 133 related to the plurality of frame images. The generated captured image data 133 is stored in the storage unit 13. The resolution of the frame image captured by the imaging unit 14 corresponds to the number of imaging elements included in the camera. For example, the number of pixels in the vertical direction and the horizontal direction of the frame image is the same as the number of imaging elements in the vertical direction and the horizontal direction arranged in the camera.

The image processing CPU 151 of the image processing unit 15 is a processor (one or more processing units) that reads and executes the image processing program 132 stored in the storage unit 13, and executes various types of processing on the captured image data 133 by performing various types of arithmetic processing. Note that the image processing unit 15 may include a plurality of processors (e.g., a plurality of CPUs and/or digital signal processors (DSPs)), and the plurality of processors may execute a plurality of processes executed by the image processing CPU 151 of the present embodiment. In this case, "one or more processing units" are configured by the plurality of processors. In this case, the plurality of processors may be involved in a common process, or the plurality of processors may independently execute different processes in parallel. The plurality of processors may include the CPU 11.

For example, the image processing CPU 151 of the image processing unit 15 extracts a part of the captured image data

133 related to the frame image and generates the output image data 134. In addition, the image processing CPU 151 executes subject tracking processing for tracking a subject in a plurality of frame images. The subject tracking processing will be described in detail later. Furthermore, the image processing CPU 151 may perform various types of image conversion processing such as shading correction and color correction on the captured image data 133 and/or the output image data 134. Furthermore, the image processing unit 15 may internally include an image processing storage unit separate from the RAM 12 and the storage unit 13, and some of the programs and data stored in the RAM 12 and/or the storage unit 13 may be stored in the image processing storage unit.

The display unit 16 includes a display device such as a liquid crystal display. In accordance with the output image data 134 and a control signal transmitted from the CPU 11, the display unit 16 reproduces and displays a captured moving image or displays an object imaged by the imaging unit 14 as a live view image (through-the-lens image) in real time.

The operation unit 17 includes a touch panel provided so as to overlap a display screen of the display unit 16, an operation button provided on a housing of the electronic device 1, and the like. The operation unit 17 detects a touch of a finger or the like on the touch panel or an operation on an operation button, and outputs an operation signal corresponding to the detection result to the CPU 11.

<Operation of Electronic Device>

Next, an operation of the electronic device 1 will be described focusing on an operation of capturing a moving image and an operation related to tracking of a subject during the capturing of a moving image.

FIG. 2 is a diagram illustrating a frame image region 20 related to a plurality of frame images captured by the imaging unit 14.

Hereinafter, an upper left vertex of a rectangle formed by the frame image region 20 in FIG. 2 is defined as an origin, an axis parallel to the outer side extending in the left-right direction of the frame image region 20 and having a direction from the origin toward the right as a positive direction is defined as an X axis, and an axis parallel to the outer side extending in the up-down direction of the frame image region 20 and having a direction from the origin toward the lower side as a positive direction is defined as a Y axis. The frame image region 20 is a region including pixels in the same array as each frame image. Therefore, the number of pixels in the X direction and the Y direction of the frame image region 20 is the same as the number of pixels in the X direction and the Y direction of each frame image (captured image data 133). Furthermore, an arbitrary pixel position in the frame image region 20 can be identified using the X coordinate and the Y coordinate.

In a central part of the frame image region 20, a rectangular output target region 21 smaller than the frame image region 20 is set as a range for which image data is output. The image processing CPU 151 of the image processing unit 15 of the present embodiment extracts image data of a part within the range of the output target region 21 out of the entire frame image (captured image data 133) (corresponding to frame image region 20), and outputs the image data to the CPU 11 as the output image data 134. That is, the image processing CPU 151 extracts, from each frame image, an output image having a smaller angle of view than the frame image, and outputs the output image to the CPU 11. The CPU 11 records the generated plurality of pieces of output image data 134 related to the plurality of output images in the storage unit 13 as reproducible moving image data. In parallel, the CPU 11 transmits the generated plurality of pieces of output image data 134 as they are to the display unit 16, thereby causing the display unit 16 to display the object being imaged by the imaging unit 14 as a live view image in real time. Note that the plurality of pieces of output image data 134 may be simply displayed on the display unit 16 as a live view image without being recorded as moving image data.

As described above, by setting the output target region 21 which is a part of the frame image region 20 as an output target of the image data, the data amount of the image data to be read can be reduced. In addition, it is possible to achieve a high frame rate by shortening the reading time of the image data and to lower the transfer rate (reading speed) of the image data while maintaining the reading time.

The size of the output target region 21 (number of pixels (resolution) in X direction and Y direction) is set according to the output standard to be satisfied by the output image data 134 to be output. The output standard is not particularly limited, but may be, for example, HD (1280×720 pixels), full HD (1920×1080 pixels), or the like. Furthermore, the output target region 21 does not necessarily have a similar shape to the frame image region 20.

Of the frame image region 20, the central part in which the output target region 21 is set includes a center point (intersection of diagonal lines of rectangle) of the frame image region 20. In the present embodiment, it is assumed that a range in which the output target region 21 is set in FIG. 2 is a central part of the output target region 21. In FIG. 2, the output target region 21 is set at a position where the center point of the frame image region 20 and the center point of the output target region 21 overlap. Note, however, that the present disclosure is not limited thereto, and the center point of the output target region 21 may be slightly shifted from the center point of the frame image region 20. The position of the output target region 21 illustrated in FIG. 2 is an initial position, and as will be described later, the position of the output target region 21 is changed according to the tracking situation of the subject. The setting range (e.g., X coordinate and Y coordinate of pair of opposite vertices of rectangle formed by setting range) of the output target region 21 in the frame image region 20 is stored in the region setting data 136 of the storage unit 13, and is updated when changed.

In the present embodiment, a case where a person who moves in the +X direction on a bicycle is imaged as a subject 30 by the electronic device 1 held by and fixed to the user's hand will be described as an example. Therefore, the plurality of frame images to be captured include the subject 30 moving in the +X direction and the background of the subject 30. While the background of the subject 30 is omitted in FIG. 2, the background is actually captured over the entire frame image region 20. On the other hand, as described above, during imaging, the range of the output target region 21 in the frame image region 20 is displayed as a live view image on the display unit 16.

FIG. 2 illustrates a frame image Im1 (first image) among a plurality of frame images. In the frame image Im1, it is assumed that the subject 30 (specifically, tip end part of bicycle included in subject 30) reaches the right end of the output target region 21. Furthermore, in FIG. 2, the position of the subject 30 in a certain frame image generated before the frame image Im1 among the plurality of frame images is indicated by a broken line. As described above, the subject 30 moves from the position of the broken line to the right end of the output target region 21 from the certain frame image to the frame image Im1. From such background to the movement, there is a high possibility that the subject 30 will further move in the +X direction and go out of the output target region 21. Note that in the present embodiment, "the subject 30 going out of the output target region 21" is assumed to be "at least a part (e.g., tip end part of bicycle included in subject 30) of the subject 30 going out of the output target region 21".

When the subject 30 goes out of the output target region 21 displayed as a live view image on the display unit 16, the user cannot check the entire subject 30 on the display unit 16. This problem can be solved if the user can change the direction of the electronic device 1 by himself/herself to recapture the subject 30 inside the output target region 21, but it is not always easy to appropriately perform such an operation every time depending on the way of movement, size, and the like of the subject 30.

Therefore, when the subject 30 goes out of the output target region 21, the image processing CPU 151 of the image processing unit 15 of the present embodiment attempts to detect the subject 30 in a part of the frame image region 20 outside the output target region 21. Then, if the subject 30 is detected, the image processing CPU 151 resets the output target region 21 such that the detected subject 30 enters the output target region 21 (i.e., position of output target region 21 in frame image region 20 is changed). In other words, when the subject 30 goes out of the output target region 21, the image processing CPU 151 resets the output target region 21 so as to track the subject 30. Hereinafter, an operation related to the tracking of the subject 30 will be described.

In order to track the subject 30, the image processing CPU 151 sets, in advance, rectangular out-of-frame monitor regions 22a to 22d (hereinafter referred to as "out-of-frame monitor region 22" when referring to any one of out-of-frame monitor regions 22a to 22d), which are targets for detecting the subject 30, in positions deviated in a predetermined direction from the central part in a part of the frame image region 20 outside the output target region 21. Specifically, as illustrated in FIG. 2, the out-of-frame monitor region 22a is set in a position deviated in the +X direction from the output target region 21, the out-of-frame monitor region 22b is set in a position deviated in the +Y direction from the output target region 21, the out-of-frame monitor region 22c is set in a position deviated in the −X direction from the output target region 21, and the out-of-frame monitor region 22d is set in a position deviated in the −Y direction from the output target region 21. In this manner, the image processing CPU 151 sets one out-of-frame monitor region 22 for each of the four sides of the output target region 21. Among them, the length and the extension range of the out-of-frame monitor regions 22a and 22c in the Y direction are the same as the length and the extension range of the output target region 21 in the Y direction. Moreover, the length and the extension range of the out-of-frame monitor regions 22b and 22d in the X direction are the same as the length and the extension range of the output target region 21 in the X direction. The widths of the out-of-frame monitor regions 22a and 22c in the X direction are determined within a range equal to or less than an interval between the output target region 21 and the outer side of the frame image region 20 in the X direction. The widths of the out-of-frame monitor regions 22b and 22d in the Y direction are determined within a range equal to or less than an interval between the output target region 21 and the outer side of the frame image region 20 in the Y direction. Note that the lengths of the out-of-frame monitor regions 22a and 22c in the Y direction may be longer than the length of the output target region 21 in the Y direction. In addition, the lengths of the out-of-frame monitor regions 22b and 22d in the X direction may be longer than the length of the output target region 21 in the X direction. In the example illustrated in FIG. 2, the image processing CPU 151 sets the out-of-frame monitor region 22 in a position not in contact with the outer periphery of the output target region 21 (i.e., in position where gap is generated between output target region 21 and out-of-frame monitor region 22).

In addition, the image processing CPU 151 sets a rectangular in-frame monitor region 23 to be a subject detection target in an end part in the frame of the output target region 21. FIG. 2 illustrates one in-frame monitor region 23 set in an end part of the output target region 21 along a side on the out-of-frame monitor region 22a side (+X direction side). The size (number of pixels) of the in-frame monitor region 23 in the X direction and the Y direction can be the same as the size (number of pixels) of the out-of-frame monitor region 22a in the X direction and the Y direction. Note that although not illustrated in FIG. 2, the in-frame monitor region 23 is also set in each of an end part along a side on the out-of-frame monitor region 22b side, an end part along a side on the out-of-frame monitor region 22c side, and an end part along a side on the out-of-frame monitor region 22d side of the output target region 21. The in-frame monitor regions 23 set on the out-of-frame monitor region 22b side and the out-of-frame monitor region 22d side can have the same size as the out-of-frame monitor regions 22b and 22d. Moreover, the in-frame monitor region 23 set on the out-of-frame monitor region 22c side can have the same size as the out-of-frame monitor region 22c.

The setting ranges (e.g., X coordinate and Y coordinate of pair of opposite vertices of rectangle formed by setting range) of the out-of-frame monitor region 22 and the in-frame monitor region 23 in the frame image region 20 are stored in the region setting data 136 of the storage unit 13.

When imaging by the imaging unit 14 is started, the image processing CPU 151 executes detection processing for detecting the subject 30 in the output target region 21 of the frame image region 20. The image processing CPU 151 determines the detected subject 30 as a tracking target.

For example, the detection processing may be processing of extracting and identifying a tracking target (detection target) subject 30 included in the output target region 21 on the basis of a result of predetermined image recognition processing on image data of a part of the captured image data 133 of a certain frame image corresponding to the output target region 21. Specifically, by pattern matching processing, a certain image pattern representing a feature of the subject 30 may be searched from a part of the captured image data 133 corresponding to the output target region 21, and the subject 30 may be identified on the basis of the search result. Alternatively, a part of the captured image data 133 corresponding to the output target region 21 may be input to a machine learning model machine-learned in advance using an image of the subject 30 as training data, and the subject 30 may be identified on the basis of the recognition result of the subject 30 by the machine learning model.

Alternatively, the detection processing may be processing of, on the basis of an operation of the user tapping a point on the display unit 16, extracting and identifying an object shown in the vicinity of the tapped point as the subject 30.

Information related to the identified subject 30 is stored in the subject data 135 of the storage unit 13. Information stored in the subject data 135 may be any information as long as the information is necessary for detecting the subject

30 in the subsequent detection processing. For example, the information may be image data of a part of the captured image data 133 corresponding to the identified subject 30, or may be data related to a feature of the subject 30 used for extraction and identification of the subject 30 described above. In the present embodiment, it is assumed that an image of the subject 30 (person on bicycle) illustrated in FIG. 2 is stored in the subject data 135. When the subject 30 is identified by the detection processing in the output target region 21, the detection target present flag 121 is set to "1 (on)".

When the subject 30 is identified by the detection processing in the output target region 21, the image processing CPU 151 thereafter executes detection processing for detecting the subject 30 in the in-frame monitor region 23 of the output target region 21 every time a frame image is acquired. In the detection processing, the image processing CPU 151 detects whether or not at least a part of the subject 30 has entered the in-frame monitor region 23 on the basis of information stored in the subject data 135. Then, after detecting the subject 30 in the in-frame monitor region 23 in a certain frame image, when the subject 30 reaches an end part (i.e., end part of output target region 21) of the in-frame monitor region 23 in the next frame image, the image processing CPU 151 further determines that the subject 30 will go out of the output target region 21 in the next frame image, and starts tracking the subject 30. In the frame image Im1 illustrated in FIG. 2, the subject 30 reaches the end part of the in-frame monitor region 23 (output target region 21). Therefore, the image processing CPU 151 starts tracking the subject 30 outside the output target region 21 from the frame image acquired next to the frame image Im1. When tracking of the subject 30 is started, the searching flag 122 is set to "1 (on)".

When tracking of the subject 30 outside the output target region 21 is started, the image processing CPU 151 executes detection processing for detecting the subject 30 in the out-of-frame monitor region 22 every time a frame image is acquired. The detection processing here can be performed by a method similar to the detection processing in the in-frame monitor region 23 described above. Furthermore, in the detection processing in the out-of-frame monitor region 22, the subject 30 may be detected on the basis of a part of information related to the subject 30 stored in the subject data 135, that is, information related to a part of the subject 30 in the most recent frame image (frame image Im1 in FIG. 2) before the start of tracking that has entered the in-frame monitor region 23. For example, the subject 30 in the out-of-frame monitor region 22 may be detected on the basis of image data related to a part (part on front side including front wheel of bicycle) of the subject 30 in FIG. 2 that has entered the in-frame monitor region 23. In addition, the image processing CPU 151 may execute the detection processing in each of the four out-of-frame monitor regions 22a to 22d. Alternatively, the detection processing may be executed only for the out-of-frame monitor region 22 (out-of-frame monitor region 22a in FIG. 2) adjacent to the in-frame monitor region 23 in which the subject 30 is detected most recently.

FIG. 3 is a diagram illustrating the frame image region 20 when the subject 30 is detected in the out-of-frame monitor region 22a.

FIG. 3 illustrates a frame image Im2 (second image) generated after the frame image Im1 among the plurality of frame images. The frame image Im2 is not necessarily the next image of the frame image Im1, and one or two or more other frame images may be sandwiched between the frame image Im1 and the frame image Im2 In the frame image Im2, a part of the subject 30 (part on front side including front wheel of bicycle) has entered the out-of-frame monitor region 22a. Therefore, the image processing CPU 151 detects that the subject 30 is located in the out-of-frame monitor region 22a by the detection processing in the out-of-frame monitor region 22a. Note that it is assumed that the subject 30 has also moved slightly in the −Y direction from the state illustrated in FIG. 2.

As described above, in a case where the subject 30 is detected by the detection processing in the in-frame monitor region 23 of the frame image Im1 and then the subject 30 is detected by the detection processing in the out-of-frame monitor region 22a of the frame image Im2, the image processing CPU 151 resets the position of the output target region 21 in the frame image Im2, so that the output target region 21 includes, in an end part thereof, at least a part of the out-of-frame monitor region 22a.

Figure 4:
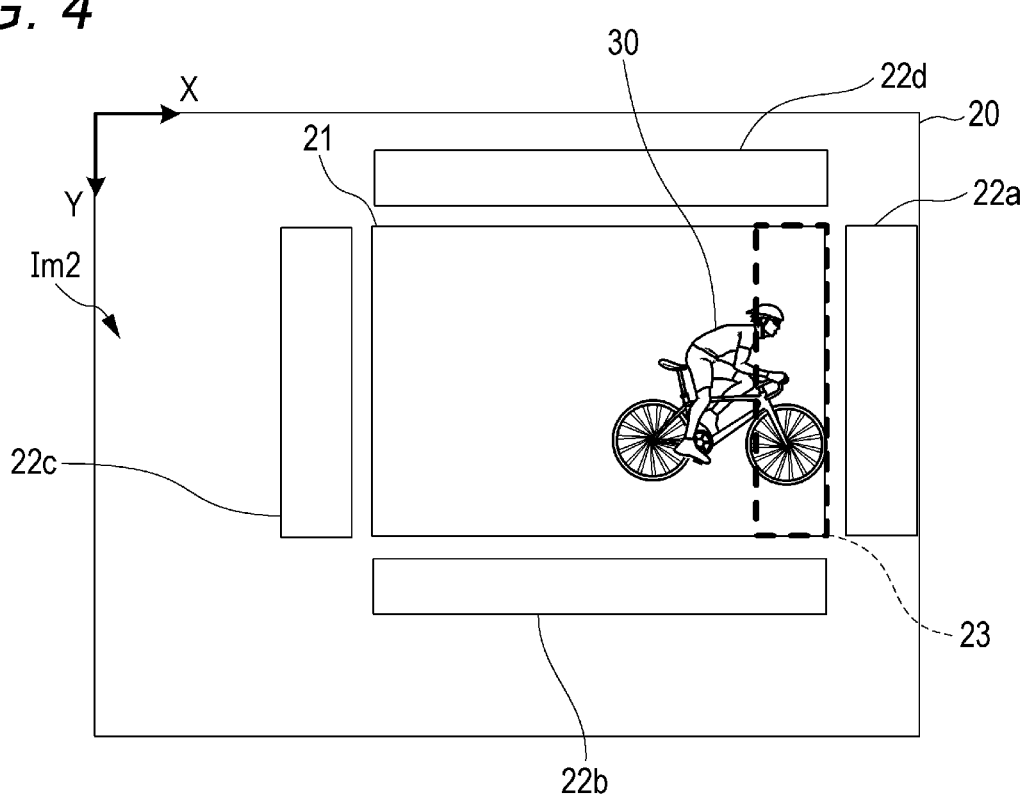
FIG. 4 is a diagram illustrating a frame image region in a state in which the out-of-frame monitor region is reset.

FIG. 4 is a diagram illustrating the frame image region 20 in a state in which the out-of-frame monitor region 22 is reset.

In the reset output target region 21 illustrated in FIG. 4, the X coordinate of the right end is the same as the X coordinate of the right end of the out-of-frame monitor region 22a before resetting illustrated in FIG. 3. That is, the reset output target region 21 is a region including, in an end part on the +X direction thereof, at least a part of the out-of-frame monitor region 22a before resetting. In other words, the image processing CPU 151 resets the position of the output target region 21 in the frame image Im2 such that the output target region 21 includes, in an end part thereof, at least a part of the out-of-frame monitor region 22a.

Here, the position of the output target region 21 in the Y direction is also adjusted in accordance with the detected position of the subject 30 in the Y direction. That is, the output target region 21 is reset to a position shifted toward the −Y direction side from the output target region 21 before resetting illustrated in FIG. 3 such that the subject 30 in the frame image Im2 is positioned substantially at the center of the reset output target region 21 in the Y direction. More specifically, the image processing CPU 151 determines the position of the reset output target region 21 such that the position of the subject 30 in the in-frame monitor region 23 in the output target region 21 before resetting in the frame image Im1 coincides with the position of the subject 30 in the in-frame monitor region 23 in the reset output target region 21 in the frame image Im2 As a result, the movement of the subject 30 in the Y direction can be tracked in addition to the movement of the subject 30 in the X direction.

Note that in a case where tracking in the Y direction is not performed, the position of the output target region 21 may be reset to be a region including, in an end part thereof, the entire out-of-frame monitor region 22a illustrated in FIG. 3.

In the frame image Im2, image data of a part corresponding to the reset output target region 21 is extracted and output image data 134 is generated. Therefore, the moving image to be recorded and the preview image displayed on the display unit 16 are adjusted to a state in which the entire subject 30 is captured in the right end in the frame of the frame image Im2 In other words, the subject 30 that has gone out of the output target region 21 after the frame of the frame image Im1 is tracked and adjusted to re-enter the output target region 21 in the frame of the frame image Im2 Moreover, when the subject 30 is detected in the out-of-frame monitor region 22 and the output target region 21 is reset, the searching flag 122 is temporarily set to "0 (off)". Note, however, that as will be described later, when the subject 30 goes out of the output target region 21 again, the searching flag 122 is set to "1 (on)" again.

When resetting the output target region 21, the image processing CPU 151 also resets the four out-of-frame monitor regions 22. Specifically, the image processing CPU 151 resets the out-of-frame monitor regions 22a to 22d such that the positional relationship between the output target region 21 and the out-of-frame monitor regions 22a to 22d after resetting of the output target region 21 (FIG. 4) is the same as the positional relationship between the output target region 21 and the out-of-frame monitor regions 22a to 22d before resetting of the output target region 21 (FIG. 3). In FIG. 4, it is assumed that the reset out-of-frame monitor region 22a is in contact with the outer side of the frame image region 20.

The image processing CPU 151 also resets the in-frame monitor region 23 according to the position of the reset output target region 21.

When the output target region 21, the out-of-frame monitor region 22, and the in-frame monitor region 23 are reset, similarly to after the first setting of the output target region 21, detection processing of the subject 30 is executed in the in-frame monitor region 23, and it is determined whether or not the subject 30 has gone out of the output target region 21. When it is determined that the subject 30 has gone out of the output target region 21, tracking of the subject 30 is started, and detection processing of the subject 30 is executed in the out-of-frame monitor region 22.

Figure 5:
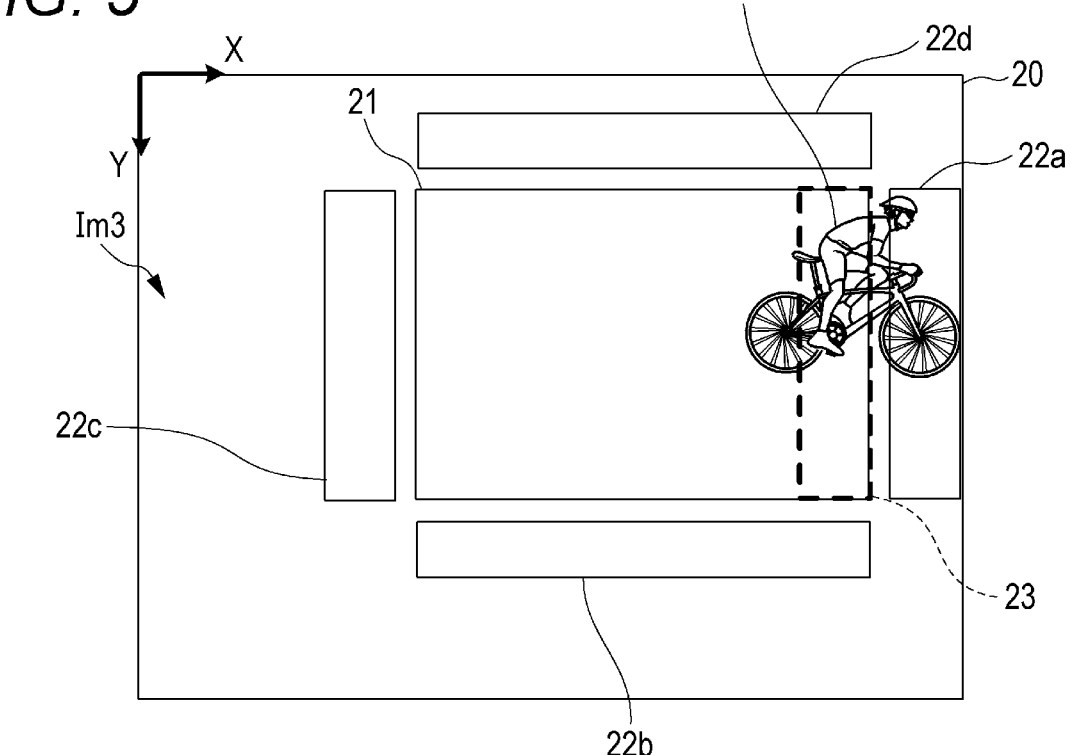
FIG. 5 is a diagram illustrating a frame image region when a subject is detected in the reset out-of-frame monitor region.

FIG. 5 is a diagram illustrating the frame image region 20 when the subject 30 is detected in the reset out-of-frame monitor region 22a.

FIG. 5 illustrates a frame image Im3 generated after the frame image Im2 among the plurality of frame images. When focusing on a combination of the frame image Im2 and the frame image Im3, the frame image Im2 corresponds to the "first image", and the frame image Im3 corresponds to the "second image". In the frame image Im3, a part of the subject 30 is in the reset out-of-frame monitor region 22a. Note that it is assumed that the subject 30 has also moved slightly further in the −Y direction from the state illustrated in FIG. 4.

As described above, in a case where the subject 30 is detected by the detection processing in the in-frame monitor region 23 of the frame image Im2 illustrated in FIG. 4 and then the subject 30 is detected by the detection processing in the out-of-frame monitor region 22a of the frame image Im3 illustrated in FIG. 5, the image processing CPU 151 resets the position of the output target region 21 in the frame image Im3 such that the output target region 21 includes, in an end part thereof, at least a part of the out-of-frame monitor region 22a in FIG. 4.

Figures 6, 7:
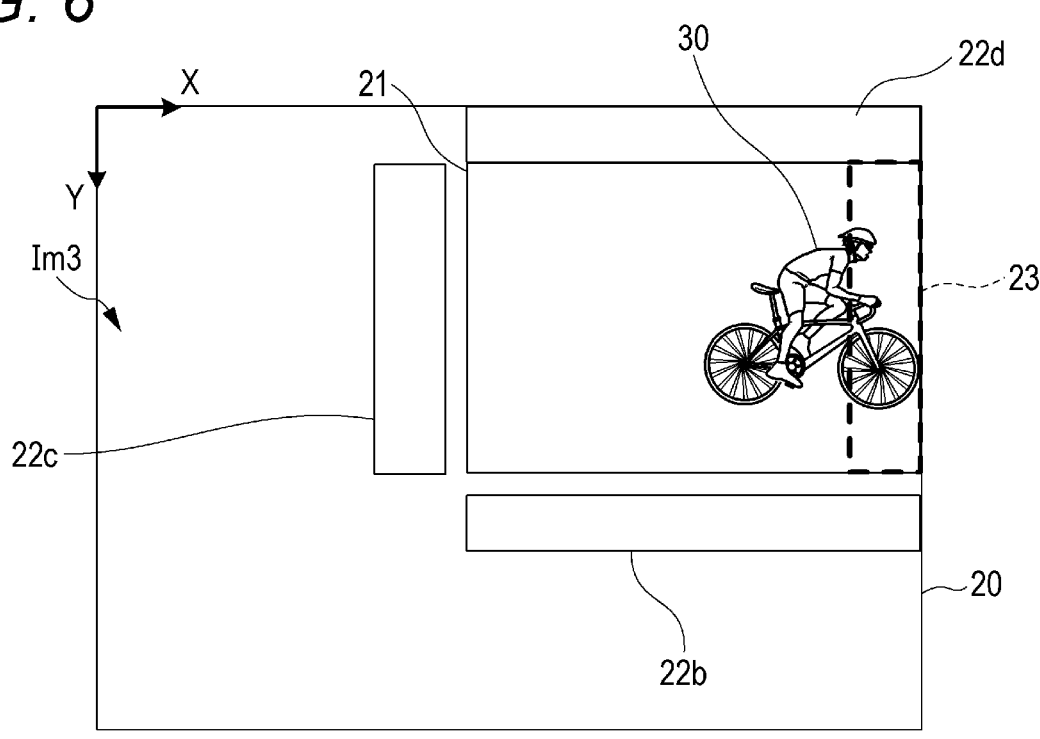
FIG. 6 is a view illustrating the frame image region in a state in which the out-of-frame monitor region is reset for the second time.
FIG. 7 is a diagram illustrating an example of setting the out-of-frame monitor region in a position in contact with the outer side of the frame image region.

FIG. 6 is a diagram illustrating the frame image region 20 in a state in which the out-of-frame monitor region 22 is reset for the second time.

In the reset output target region 21 illustrated in FIG. 6, the X coordinate of the right end is the same as the X coordinate of the right end of the out-of-frame monitor region 22a before resetting illustrated in FIG. 5. Therefore, the reset output target region 21 is in contact with the outer side of the frame image region 20 on the +X direction side. As described above, when the out-of-frame monitor region 22a before resetting is in contact with the outer side of the frame image region 20, the image processing CPU 151 resets the output target region 21 to a position in contact with the outer side of the frame image region 20.

Moreover, the output target region 21 is reset to a position shifted toward the −Y direction side from the output target region 21 before resetting illustrated in FIG. 5 such that the subject 30 in the frame image Im3 is positioned substantially at the center of the output target region 21 in the Y direction. More specifically, the image processing CPU 151 determines the position of the reset output target region 21 such that the position of the subject 30 in the in-frame monitor region 23 in the output target region 21 before resetting in the frame image Im2 coincides with the position of the subject 30 in the in-frame monitor region 23 in the reset output target region 21 in the frame image Im3.

When resetting the output target region 21 for the second time, the image processing CPU 151 also resets the out-of-frame monitor region 22. Note, however, that since the output target region 21 here is already in contact with the outer side of the frame image region 20 on the +X direction side, the out-of-frame monitor region 22a cannot be set at a position deviated in the +X direction from the output target region 21. Therefore, resetting of the out-of-frame monitor region 22a is omitted. Further, since the output target region 21 is shifted to the −Y direction side twice, the out-of-frame monitor region 22d on the −Y direction side cannot be reset so that the positional relationship with the output target region 21 is the same before and after the resetting. Therefore, as illustrated in FIG. 6, the out-of-frame monitor region 22d is reset to a position in contact with the outer side of the frame image region 20 on the −Y direction side.

Note that while it has been assumed in the above description that the subject 30 that has gone out of the output target region 21 is headed toward the out-of-frame monitor region 22a, the subject 30 may return to the output target region 21 before entering the out-of-frame monitor region 22a. Therefore, when tracking of the subject 30 is started, the detection processing is also executed in the in-frame monitor region 23 (or entire output target region 21) in parallel with the detection processing in the out-of-frame monitor region 22a. When the subject 30 is detected in the in-frame monitor region 23 (or output target region 21) after the start of tracking, the output target region 21, the out-of-frame monitor region 22, and the in-frame monitor region 23 are not reset, and the tracking is ended. In addition, the searching flag 122 is set to "0 (off)".

After the subject 30 goes out of the output target region 21 and the tracking of the subject 30 is started, when the subject 30 is not detected in the detection processing in either the out-of-frame monitor region 22 or the output target region 21 and a predetermined tracking duration elapses, the tracking of the subject 30 may be stopped. As a result, in a case where tracking cannot be performed due to movement of the subject 30 in an unexpected direction, change of the direction of the imaging unit 14 of the electronic device 1 to a direction different from the subject 30, or the like, unnecessary tracking can be avoided from being continued. When the tracking is stopped, the detection target present flag 121 and the searching flag 122 are set to "0 (off)". In addition, the output target region 21, the out-of-frame monitor region 22, and the in-frame monitor region 23 are reset to the positions in the initial state illustrated in FIG. 2. The tracking duration is preset and stored in the storage unit 13. The tracking duration may be changeable by a user's operation on the operation unit 17.

Figure 8:
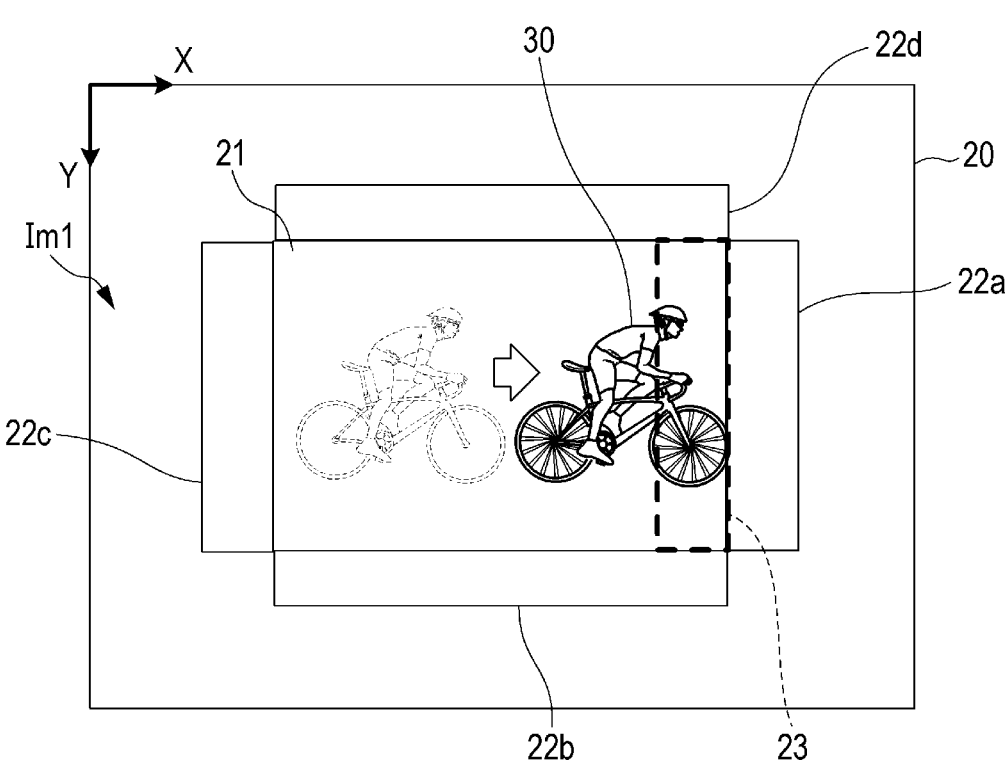
FIG. 8 is a diagram illustrating an example of setting the out-of-frame monitor region in a position in contact with the outer side of an output target region.

Furthermore, in the above description, at the time of setting the first output target region 21 illustrated in FIG. 2, the out-of-frame monitor regions 22a to 22d are set in positions not in contact with any of the outer sides (outer periphery) of the output target region 21 or the outer side of the frame image region 20. However, the present disclosure is not limited thereto. For example, as illustrated in FIG. 7, the out-of-frame monitor regions 22a to 22d may be set in positions in contact with the outer sides of the frame image region 20. Further, as illustrated in FIG. 8, the out-of-frame monitor regions 22a to 22d may be set in positions in contact with the outer sides of the output target region 21.

In addition, the initial positions and/or sizes of the output target region 21, the out-of-frame monitor region 22, and the in-frame monitor region 23 may be changeable by a user's operation on the operation unit 17.

<Subject Tracking Processing>

Next, subject tracking processing executed by the image processing CPU 151 of the image processing unit 15 to implement the above-described operation related to tracking of the subject 30 will be described.

Figure 9:
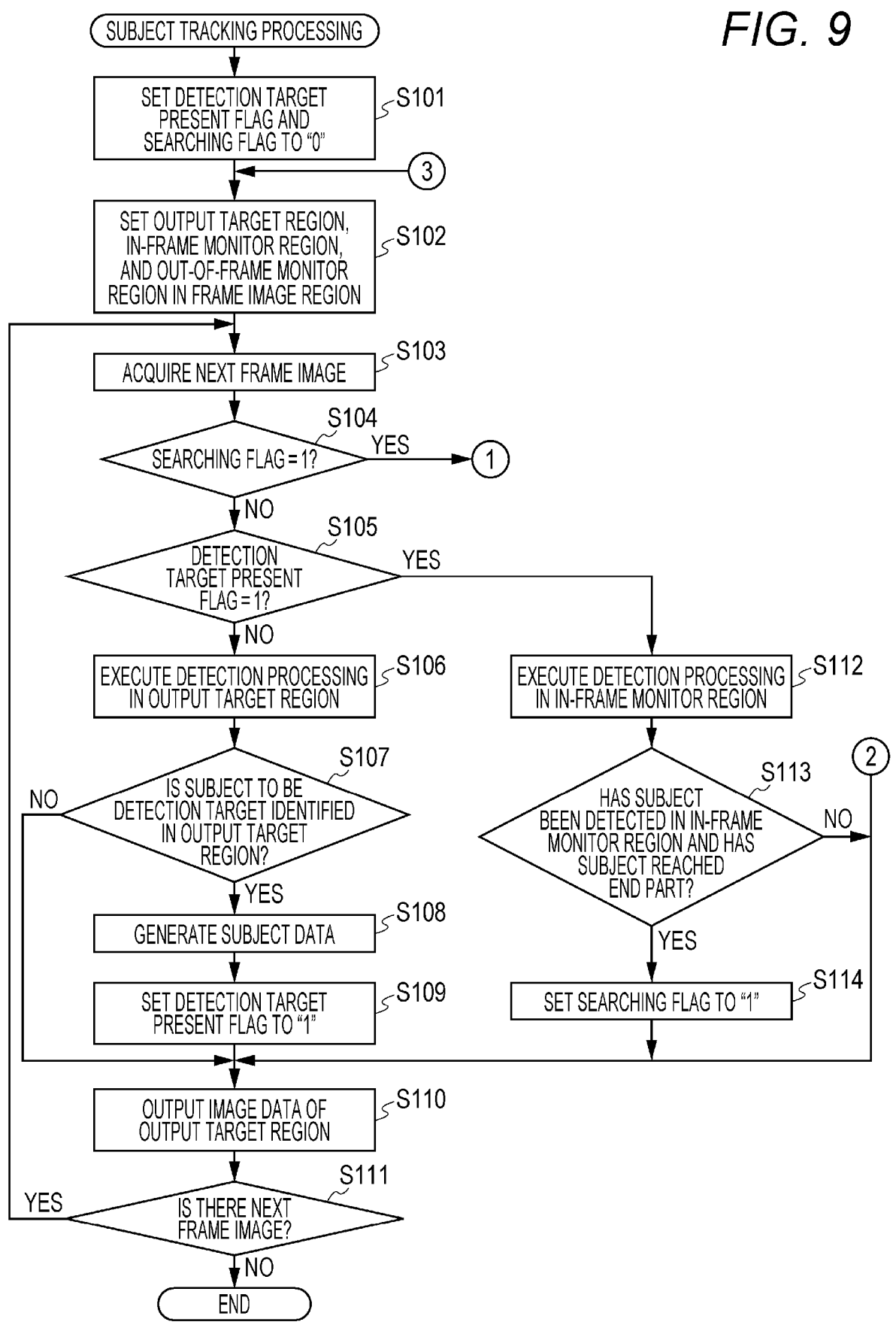
FIG. 9 is a flowchart illustrating a control procedure of subject tracking processing.
Figure 10:
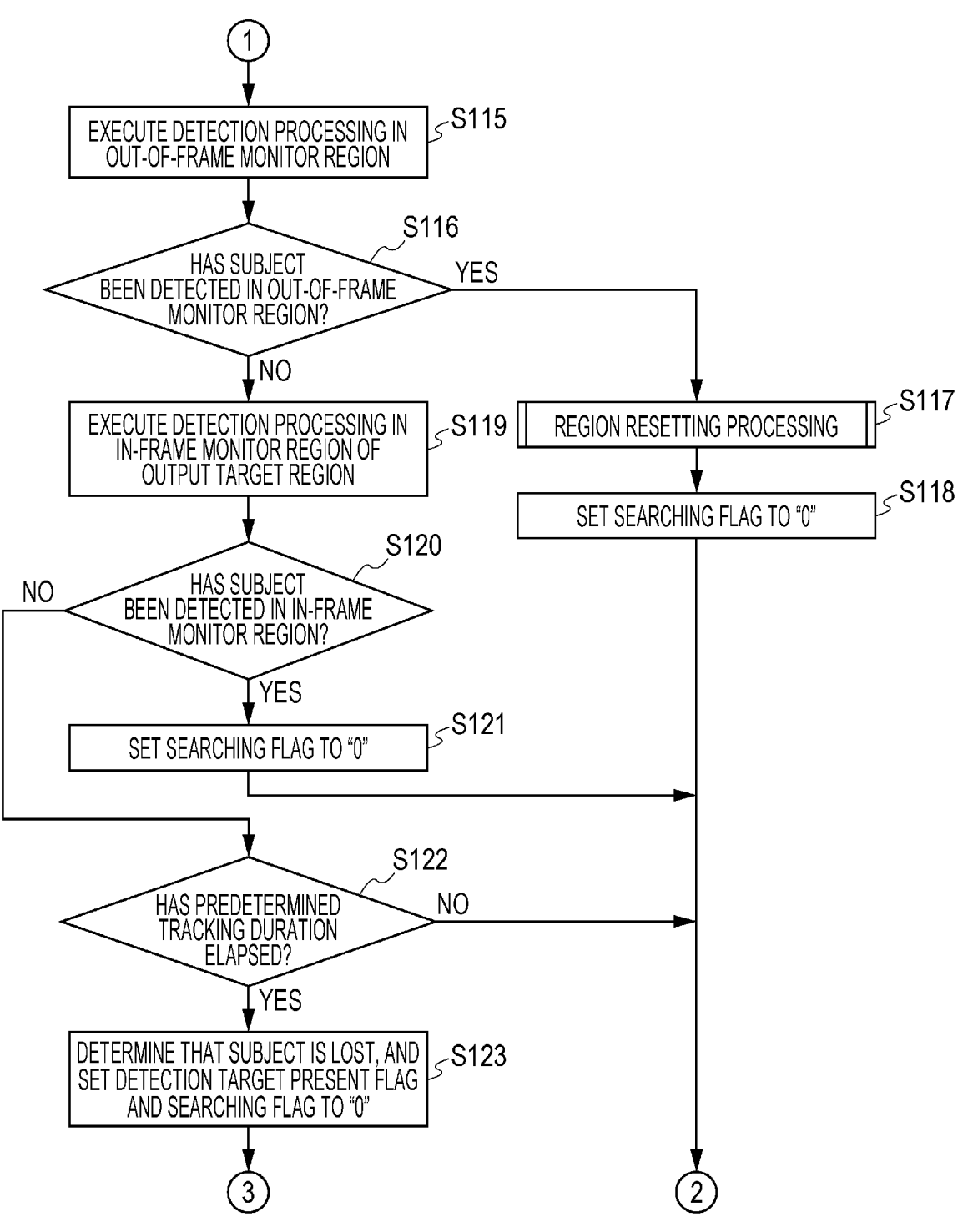
FIG. 10 is a flowchart illustrating a control procedure of subject tracking processing.

FIGS. 9 to 11 are flowcharts illustrating a control procedure of subject tracking processing.

Subject tracking processing is started when imaging by the imaging unit 14 is started after activation of the electronic device 1.

When the subject tracking processing is started, the image processing CPU 151 sets the detection target present flag 121 and the searching flag 122 to "0" (step S101).

The image processing CPU 151 sets the output target region 21, the out-of-frame monitor region 22, and the in-frame monitor region 23 to predetermined initial positions (positions illustrated in FIG. 2) in the frame image region 20, and stores the setting contents in the region setting data 136 (step S102).

The image processing CPU 151 acquires the output image data 134 related to the next (if it is immediately after start of imaging, the first) frame image generated by the imaging unit 14 (step S103). In the present embodiment, acquiring the output image data 134 related to a frame image corresponds to "acquiring an image".

The image processing CPU 151 determines whether or not the detection target present flag 121 is "1" (step S104) and determines whether or not the searching flag 122 is "1" (step S105). If it is determined that the detection target present flag 121 is "0" ("NO" in step S104) and the searching flag 122 is "0" ("NO" in step S105), the image processing CPU 151 executes the above-described detection processing in the output target region 21 (step S106).

When the subject 30 to be the detection target (tracking target) is identified in the output target region 21 by the detection processing ("YES" in step S107), the image processing CPU 151 generates the subject data 135 related to the identified subject 30 and stores the subject data 135 in the storage unit 13 (step S108). Additionally, the image processing CPU 151 sets the detection target present flag 121 to "1" (step S109).

When step S109 ends, or when the subject 30 to be the detection target is not identified in step S107 ("NO" in step S107), the image processing CPU 151 extracts image data of a part of the captured image data 133 corresponding to the output target region 21, and outputs the image data to the CPU 11 as the output image data 134 (step S110). Thereafter, the image processing CPU 151 determines whether or not there is a next frame image (step S111). If it is determined that there is a next frame image (step S111), the image processing CPU 151 returns the processing to step S103 and acquires the captured image data 133 related to the next frame image.

In the processing related to the frame image acquired after the detection target present flag 121 is set to "1", the image processing CPU 151 determines that the detection target present flag 121 is "1" in step S105 ("YES" in step S105). In this case, the image processing CPU 151 executes detection processing in the in-frame monitor region 23 (step S112). In addition, the image processing CPU 151 determines whether or not the subject 30 is detected in the in-frame monitor region 23 by the detection processing and the subject 30 has reached the end part of the in-frame monitor region 23 (step S113). If it is determined that the subject 30 has been detected in the in-frame monitor region 23 and that the subject 30 has reached the end part of the in-frame monitor region 23 ("YES" in step S113), the image processing CPU 151 determines that the subject 30 will go out of the output target region 21 in the next frame image, sets the searching flag 122 to "1", and starts tracking the subject 30 (step S114). In addition, the image processing CPU 151 causes the processing to proceed to step S110.

On the other hand, if it is determined that the subject 30 is has not been detected in the in-frame monitor region 23 or that even though the subject 30 has been detected, the subject 30 has not reached the end part of the in-frame monitor region 23 ("NO" in step S113), the image processing CPU 151 maintains the searching flag 122 at "0" and causes the processing to proceed to step S110.

In the processing related to the frame image acquired after the searching flag 122 is set to "1", in step S104, the image processing CPU 151 determines that the searching flag 122 is "1" ("YES" in step S104), and causes the processing to proceed to step S115 in FIG. 10.

In step S115, the image processing CPU 151 executes detection processing in the out-of-frame monitor region 22. If it is determined that the subject 30 has been detected in the out-of-frame monitor region 22 ("YES" in step S116), the image processing CPU 151 executes region resetting processing (step S117).

FIG. 11 is a flowchart illustrating a control procedure of region resetting processing.

When region resetting processing is called, the image processing CPU 151 resets the output target region 21 so as to be a region including, in an end part thereof, the out-of-frame monitor region 22 where the subject 30 is detected, and updates the region setting data 136 according to the contents of the resetting (step S201). In addition, the in-frame monitor region 23 is reset to the end part of the reset output target region 21, and the region setting data 136 is updated according to the contents of the resetting (step S202).

The image processing CPU 151 determines whether or not it is possible to set the four out-of-frame monitor regions 22a to 22d according to a predetermined positional relationship with respect to the reset output target region 21 (step S203), and if it is determined that it is possible ("YES" in step S203), the four out-of-frame monitor regions 22a to 22d are reset according to the predetermined positional relationship with respect to the output target region 21 (step S204). In addition, the image processing CPU 151 updates the region setting data 136 according to the contents of the resetting.

If it is determined that the four out-of-frame monitor regions 22a to 22d cannot be set according to the predetermined positional relationship with respect to the reset output target region 21 ("NO" in step S203), the image processing CPU 151 determines whether or not there is a space for setting each out-of-frame monitor region 22 (step S205). If it is determined that there is a space for setting each out-of-frame monitor region 22 ("YES" in step S205), the image processing CPU 151 resets the out-of-frame monitor region 22 that cannot be set according to the predetermined positional relationship to a position in contact with the outer side of the frame image region 20, and resets the remaining out-of-frame monitor regions 22 according to the predetermined positional relationship (step S206). In addition, the image processing CPU 151 updates the region setting data 136 according to the contents of the resetting.

If it is determined that there is no space to be set for any of the out-of-frame monitor regions 22 ("NO" in step S205), the image processing CPU 151 resets each of the three (or two) settable out-of-frame monitor regions 22 according to the predetermined positional relationship, and resets the out-of-frame monitor region 22 that cannot be reset according to the predetermined positional relationship to a position in contact with the outer side of the frame image region 20 (step S207). In addition, the image processing CPU 151 updates the region setting data 136 according to the contents of the resetting.

When any one of steps S204, S206, and S207 ends, the image processing CPU 151 ends the region resetting processing and causes the processing to proceed to step S118 in FIG. 10. In step S118, the image processing CPU 151 sets the searching flag 122 to "0", and causes the processing to proceed to step S110 in FIG. 9.

On the other hand, in step S116 of FIG. 10, if it is determined that the subject 30 has not been detected by the detection processing in the out-of-frame monitor region 22 ("NO" in step S116), the image processing CPU 151 executes the detection processing in the in-frame monitor region 23 of the output target region 21 in order to determine whether or not the subject 30 has returned to the in-frame monitor region 23 (step S119). If it is determined that the subject 30 has been detected in the in-frame monitor region 23 ("YES" in step S120), the image processing CPU 151 sets the searching flag 122 to "0" (step S121), and causes the processing to proceed to step S110 in FIG. 9.

If it is determined that the subject 30 has not been detected in the in-frame monitor region 23 ("NO" in step S120), the image processing CPU 151 determines whether or not a predetermined tracking duration has elapsed (step S122). If it is determined that the tracking duration has not elapsed ("NO" in step S122), the image processing CPU 151 causes the processing to proceed to step S110 in FIG. 9. In addition, if it is determined that the tracking duration has elapsed ("YES" in step S122), the image processing CPU 151 determines that the subject 30 neither moves to the out-of-frame monitor region 22 nor returns to the output target region 21 (i.e., it is determined that subject 30 is lost), and stops tracking of the subject 30. Additionally, the image processing CPU 151 sets the detection target present flag 121 and the searching flag 122 to "0" (step S123). Thereafter, the image processing CPU 151 shifts the processing to step S102 in FIG. 9, and resets the output target region 21, the out-of-frame monitor region 22, and the in-frame monitor region 23 to the initial positions.

In step S111 of FIG. 9, if it is determined that there is no next frame image ("NO" in step S111), the image processing CPU 151 ends the subject tracking processing.

<Effect>

As described above, the electronic device 1 as the image processing device according to the present embodiment includes the image processing CPU 151 as a processing unit. The image processing CPU 151 sets, in a central part of the frame image region 20 related to a plurality of frame images, the output target region 21 smaller than the frame image region 20 as a range for which image data is output, and sets the out-of-frame monitor region 22 to be a target for detecting the subject 30 in a position deviated in a predetermined direction from the central part, in a part of the frame image region 20 outside the output target region 21.

As a result, by executing detection processing for detecting the subject 30 in the out-of-frame monitor region 22 of the frame image region 20, the subject 30 that has gone out of the output target region 21 can be detected. Therefore, the processing load of the image processing CPU 151 can be reduced and the subject 30 can be detected in a shorter time as compared with a configuration in which the subject 30 is detected with the entire frame image region 20 as a target.

Furthermore, by setting the output target region 21 which is a part of the frame image region 20 as an output target of image data, the data amount of the image data to be read can be reduced. Therefore, it is possible to achieve a high frame rate by shortening the reading time of the image data and to lower the transfer rate (reading speed) of the image data while maintaining the reading time.

Furthermore, since the tracking target subject 30 can be detected using a plurality of frame images captured by one imaging unit 14, the tracking target subject 30 can be detected while avoiding an increase in size of the device and an increase in manufacturing cost.

Furthermore, the image processing CPU 151 acquires the frame image Im1 (first image) and the frame image Im2 (second image) generated after the frame image Im1, the frame image Im1 and the frame image Im2 being included in the plurality of frame images, executes detection processing for detecting the subject 30 in the output target region 21 and the out-of-frame monitor region 22 for the frame image Im1 and the frame image Im2, and, when the subject 30 is detected in the output target region 21 of the frame image Im1 and the subject 30 is detected in a certain out-of-frame monitor region 22 of the frame image Im2 by the detection processing, resets the position of the output target region 21 in the frame image Im2 such that the output target region 21 includes, in an end part thereof, at least a part of the certain out-of-frame monitor region 22. As a result, when the tracking target subject 30 is detected in the frame image Im2, the output target region 21 can be reset such that the subject 30 is in the output target region 21. Therefore, even if the user does not adjust the capturing direction of the electronic device 1, the tracking target subject 30 can be automatically captured in the moving image being recorded or the preview image being displayed on the display unit 16. For example, in a case where the subject 30 suddenly moves or in a case where the user unintentionally changes the direction of the electronic device 1, even if the subject 30 goes out of the output target region 21, the user can keep the subject 30 within the angle of view and continue imaging without performing any special operation.

In addition, the image processing CPU 151 sets the in-frame monitor region 23 in an end part in the frame of the output target region 21, and, when the subject 30 is detected in a certain in-frame monitor region 23 of the frame image Im1 and the subject 30 is detected in a certain out-of-frame monitor region 22 of the frame image Im2 by the detection processing, resets the position of the output target region 21 in the frame image Im2 such that the output target region 21 includes, in an end part thereof, at least a part of the certain out-of-frame monitor region 22. As a result, by executing detection processing for detecting the subject 30 in the in-frame monitor region 23 that is a part of the output target region 21, it is possible to determine whether or not the subject 30 has gone out of the output target region 21. Therefore, the processing load of the image processing CPU 151 for the determination can be reduced, and the processing time can be shortened.

In addition, the image processing CPU 151 sets the in-frame monitor region 23 in an end part in the frame of the output target region 21, when the subject 30 is detected in a certain in-frame monitor region 23 of the frame image Im1 and the subject 30 is detected in a certain out-of-frame monitor region 22 of the frame image Im2 by the detection processing, resets the output target region 21 in the frame image Im2, and determines the position of the reset output target region 21 such that the position of the subject 30 in the certain in-frame monitor region 23 in the output target region 21 before resetting in the frame image Im1 and the position of the subject 30 in the certain in-frame monitor region 23 in the reset output target region 21 in the frame image Im2 coincide with each other. As a result, it is possible to prevent the position of the subject 30 in the output target region 21 from changing before and after the subject 30 goes out of the output target region 21. Therefore, the tracking target subject 30 can be captured in the output target region 21 while curbing visual discomfort caused by resetting the output target region 21.

Additionally, when the certain out-of-frame monitor region 22 is in contact with the outer side of the frame image region 20, the image processing CPU 151 resets the output target region 21 to a position in contact with the outer side of the frame image region 20. As described above, with the configuration in which the output target region 21 can move to a position in contact with the outer side of the frame image region 20, the subject 30 can be tracked using the entire frame image region 20 and can be captured in the output target region 21.

Further, when resetting the output target region 21, the image processing CPU 151 resets the out-of-frame monitor region 22 such that the positional relationship between the output target region 21 and the out-of-frame monitor region 22 after resetting of the output target region 21 is the same as the positional relationship between the output target region 21 and the out-of-frame monitor region 22 before resetting of the output target region 21. As a result, even when the subject 30 goes out of the output target region 21 again after the output target region 21 is reset, the tracking target subject 30 can be detected by performing the detection processing in the out-of-frame monitor region 22.

Furthermore, in a case where the image processing CPU 151 cannot reset the out-of-frame monitor region 22 such that the positional relationship between the output target region 21 and the out-of-frame monitor region 22 after resetting of the output target region 21 is the same as the positional relationship between the output target region 21 and the out-of-frame monitor region 22 before resetting of the output target region 21, the image processing CPU 151 resets the out-of-frame monitor region 22 to a position in contact with the outer side of the frame image region 20. As a result, even when the subject 30 moves to the vicinity of the outer side of the frame image region 20, it is possible to appropriately set the out-of-frame monitor region 22 and detect the tracking target subject 30.

In addition, the output target region 21 is rectangular, and the image processing CPU 151 sets one out-of-frame monitor region 22 for each of the four sides of the output target region 21. As a result, even if the subject 30 goes out from any of the four sides of the output target region 21, the subject 30 can be detected by detection processing in the corresponding one of the out-of-frame monitor region 22.

In addition, the image processing CPU 151 may set the out-of-frame monitor region 22 in a position in contact with the outer side of the frame image region 20. As a result, when the tracking target subject 30 moves to the vicinity of the outer side of the frame image region 20, the subject 30 can be detected. In addition, since the frequency of resetting of the output target region 21, the out-of-frame monitor region 22, and the in-frame monitor region 23 associated with the detection of the subject 30 can be minimized, the processing load of the image processing CPU 151 can be effectively reduced.

In the above embodiment, the image processing CPU 151 sets the out-of-frame monitor region 22 in a position not in contact with the outer periphery of the output target region 21. As a result, the time required for detection of the target tracking subject 30 in the out-of-frame monitor region 22 after the target tracking subject 30 goes out of the output target region 21 can be a certain time or more. Therefore, the frequency of resetting of the output target region 21, the out-of-frame monitor region 22, and the in-frame monitor region 23 accompanying detection of the subject 30 in the out-of-frame monitor region 22 can be curbed, and the processing load of the image processing CPU 151 can be reduced.

In addition, the image processing CPU 151 may set the out-of-frame monitor region 22 in a position in contact with the outer periphery of the output target region 21. As a result, when the subject 30 of the tracking processing goes out of the output target region 21, the subject 30 can be immediately detected in the out-of-frame monitor region 22 in contact with the outer periphery of the output target region 21. Therefore, the output target region 21 can be reset and the subject 30 can be captured in the output target region 21 before the subject 30 moves largely from the output target region 21. As a result, it is possible to obtain a visual effect in which the tracking target subject 30 continues to be included in the output target region 21. That is, the subject 30 can be tracked more smoothly and accurately.

In addition, the image processing CPU 151 outputs the output image data 134 as image data related to a part of the plurality of frame images within the output target region 21. As a result, the data amount of the image data to be read can be reduced. Therefore, it is possible to achieve a high frame rate by shortening the reading time of the image data and to lower the transfer rate (reading speed) of the image data while maintaining the reading time.

In addition, the electronic device 1 includes the imaging unit 14 that captures a plurality of frame images, and the image processing CPU 151 acquires the plurality of frame images captured by the imaging unit 14. As a result, it is possible to track the subject 30 in a plurality of frame images captured by the imaging unit 14 in real time.

In an image processing method executed by the image processing CPU 151 (computer) of the electronic device 1 (image processing device) according to the present embodiment, in a central part of the frame image region 20 related to a plurality of frame images, the output target region 21 smaller than the frame image region 20 is set as a range for which image data is output, and the out-of-frame monitor region 22 to be a target for detecting the subject 30 is set in a position deviated in a predetermined direction from the central part, in a part of the frame image region 20 outside the output target region 21. As a result, by executing detection processing for detecting the subject 30 in the out-of-frame monitor region 22 of the frame image region 20, the subject 30 that has gone out of the output target region 21 can be detected. Therefore, the processing load of the image processing CPU 151 can be reduced, and the subject 30 can be detected in a shorter time. Furthermore, by setting the output target region 21 which is a part of the frame image region 20 as an output target of image data, the data amount of the image data to be read can be reduced. Furthermore, since the tracking target subject 30 can be detected using a plurality of frame images captured by one imaging unit 14, the tracking target subject 30 can be detected while avoiding an increase in size of the device and an increase in manufacturing cost.

In addition, an image processing program 132 (program) according to the present embodiment causes the image processing CPU 151 (computer) of the electronic device 1 (image processing device) to execute: processing of setting, in a central part of the frame image region 20 related to a plurality of frame images, the output target region 21 smaller than the frame image region 20 as a range for which image data is output; and processing of setting the out-of-frame monitor region 22 to be a target for detecting the subject 30 in a position deviated in a predetermined direction from the central part, in a part of the frame image region 20 outside the output target region 21. As a result, by executing detection processing for detecting the subject 30 in the out-of-frame monitor region 22 of the frame image region 20, the subject 30 that has gone out of the output target region 21 can be detected. Therefore, the processing load of the image processing CPU 151 can be reduced, and the subject 30 can be detected in a shorter time. Furthermore, by setting the output target region 21 which is a part of the frame image region 20 as an output target of image data, the data amount of the image data to be read can be reduced. Furthermore, since the tracking target subject 30 can be detected using a plurality of frame images captured by one imaging unit 14, the tracking target subject 30 can be detected while avoiding an increase in size of the device and an increase in manufacturing cost.

<Other>

Note that the description in the above embodiment is an example of the image processing device, the image processing method, and the program according to the present disclosure, and the disclosure is not limited thereto.

For example, in the above embodiment, the image processing CPU 151 of the image processing unit 15 has been exemplified as "one or more processing units", but the disclosure is not limited thereto. For example, the CPU 11 may execute a part of the processing executed by the image processing CPU 151 in the above embodiment, and in this case, the image processing CPU 151 and the CPU 11 correspond to "one or more processing units". In addition, the CPU 11 may execute the entire processing executed by the image processing CPU 151 in the above embodiment, and in this case, the CPU 11 corresponds to "one or more processing units".

Furthermore, the plurality of frame images is not limited to those captured by the imaging unit 14. For example, the plurality of frame images may be included in existing moving image data. That is, the tracking technique of the subject 30 of the present disclosure may be applied in a case where image data corresponding to the output target region 21 is cut out from a plurality of frame images of existing moving image data and downsized. Therefore, the electronic device 1 as an image processing device does not need to include the imaging unit 14, and may acquire a plurality of frame images from the outside and perform image processing.

Furthermore, in the above embodiment, "the subject 30 going out of the output target region 21" is "at least a part (e.g., tip end part of bicycle included in subject 30) of the subject 30 going out of the output target region 21". Alternatively, the situation may be "the entire subject 30 going out of the output target region 21". In this case, in step S113 of FIG. 9, it may be determined as "YES" when the entire subject 30 goes out of the in-frame monitor region 23.

Furthermore, the output target region 21 may have a shape other than a rectangle, such as a polygon other than a rectangle, a circle, an ellipse, or the like. In these cases, too, by setting the out-of-frame monitor region 22 in a position deviated in a predetermined direction from the central part where the output target region 21 is set, it is possible to track the subject 30 similarly to the above embodiment. The shape of the out-of-frame monitor region 22 may be a shape corresponding to the shape of the outer periphery of the output target region 21. For example, when the outer periphery of the output target region 21 is circular, at least a part of the outer periphery of the out-of-frame monitor region 22 facing the output target region 21 may have an arc shape.

In the above description, an example in which a flash memory of the storage unit 13 is used as the computer-readable medium of the program according to the present disclosure has been disclosed, but the disclosure is not limited to this example. As another computer-readable medium, an information recording medium such as a hard disk drive (HDD), a solid state drive (SSD), or a CD-ROM can be applied. In addition, a carrier wave is also applied to the present disclosure as a medium for providing data of the program according to the present disclosure via a communication line.

In addition, it is a matter of course that the detailed configuration and detailed operation of each component of the electronic device 1 (image processing device) in the above embodiment can be appropriately changed without departing from the gist of the present disclosure.

While embodiments of the present disclosure have been described, the scope of the present disclosure is not limited to the above embodiments, and includes the scope of the disclosure described in the claims and the scope of equivalents thereof.

What is claimed is:

1. An image processing device comprising:
   at least one processor comprising hardware, wherein the at least one processor configured to:
      set, as a range for which image data is output, in a position in a central part of a frame image region related to a plurality of frame images, an output target region smaller than the frame image region;
      set an out-of-frame monitor region to be a target for detecting a subject in a position deviated in a predetermined direction from the central part, in a part of the frame image region outside the output target region;
      acquire a first image and a second image generated after the first image, the first image and the second image being included in the plurality of frame images;
      execute detection processing for detecting a subject in the output target region and the out-of-frame monitor region for the first image and the second image;
      in a case where the subject is detected in the output target region of the first image and the subject is detected in a certain out-of-frame monitor region of the second image by the detection processing, reset the position of the output target region in the second image such that the output target region includes, in an end part thereof, at least a part of the certain out-of-frame monitor region; and
      in a case where the certain out-of-frame monitor region is in contact with an outer side of the frame image region, reset the output target region to a position in contact with the outer side of the frame image region.

2. The image processing device according to claim 1, wherein the at least one processor is further configured to:
   set an in-frame monitor region in an end part in the frame of the output target region; and
   in a case where the subject is detected in a certain in-frame monitor region of the first image and the subject is detected in a certain out-of-frame monitor region of the second image by the detection processing, reset the position of the output target region in the second image such that the output target region includes, in an end part thereof, at least a part of the certain out-of-frame monitor region.

3. The image processing device according to claim 1, wherein the at least one processor is further configured to:
   set an in-frame monitor region in an end part in the frame of the output target region;
   in a case where the subject is detected in a certain in-frame monitor region of the first image and the subject is detected in a certain out-of-frame monitor region of the second image by the detection processing, reset the output target region in the second image; and
   determine the position of the reset output target region such that the position of the subject in the certain in-frame monitor region in the output target region before resetting in the first image and the position of the subject in the certain in-frame monitor region in the reset output target region in the second image coincide with each other.

4. An image processing device comprising:
   at least one processor configured to:
      set, as a range for which image data is output, in a position in a central part of a frame image region related to a plurality of frame images, an output target region smaller than the frame image region;
      set an out-of-frame monitor region to be a target for detecting a subject in a position deviated in a predetermined direction from the central part, in a part of the frame image region outside the output target region;
      acquire a first image and a second image generated after the first image, the first image and the second image being included in the plurality of frame images;
      execute detection processing for detecting a subject in the output target region and the out-of-frame monitor region for the first image and the second image;
      in a case where the subject is detected in the output target region of the first image and the subject is detected in a certain out-of-frame monitor region of the second image by the detection processing, reset the position of the output target region in the second image such that the output target region includes, in an end part thereof, at least a part of the certain out-of-frame monitor region; and
      reset the out-of-frame monitor region such that the positional relationship between the output target region and the out-of-frame monitor region after resetting of the output target region is the same as the positional relationship between the output target region and the out-of-frame monitor region before resetting of the output target region.

5. The image processing device according to claim 4, wherein, in a case where the at least one processor cannot reset the out-of-frame monitor region such that the positional relationship between the output target region and the out-of-frame monitor region after resetting of the output target region is the same as the positional relationship between the output target region and the out-of-frame monitor region before resetting of the output target region, the at least one processor is further configured to reset the out-of-frame monitor region to a position in contact with an outer side of the frame image region.

6. The image processing device according to claim 4, wherein the at least one processor is further configured to:

set an in-frame monitor region in an end part in the frame of the output target region; and in a case where the subject is detected in a certain in-frame monitor region of the first image and the subject is detected in a certain out-of-frame monitor region of the second image by the detection processing, reset the position of the output target region in the second image such that the output target region includes, in an end part thereof, at least a part of the certain out-of-frame monitor region.

7. The image processing device according to claim 4, wherein the at least one processor is further configured to:

set an in-frame monitor region in an end part in the frame of the output target region;

in a case where the subject is detected in a certain in-frame monitor region of the first image and the subject is detected in a certain out-of-frame monitor region of the second image by the detection processing, reset the output target region in the second image; and determine the position of the reset output target region such that the position of the subject in the certain in-frame monitor region in the output target region before resetting in the first image and the position of the subject in the certain in-frame monitor region in the reset output target region in the second image coincide with each other.

8. An image processing device comprising:

at least one processor configured to:

set, as a range for which image data is output, in a position in a central part of a frame image region related to a plurality of frame images, an output target region smaller than the frame image region; and set an out-of-frame monitor region to be a target for detecting a subject in a position deviated in a predetermined direction from the central part, in a part of the frame image region outside the output target region, wherein the output target region is rectangular, and wherein the at least one processor is further configured to set one out-of-frame monitor region for each of four sides of the output target region.

9. The image processing device according to claim 8, wherein the at least one processor is further configured to set the out-of-frame monitor region in a position in contact with an outer side of the frame image region.

10. The image processing device according to claim 8, wherein the at least one processor is further configured to set the out-of-frame monitor region in a position in contact with an outer periphery of the output target region.

11. The image processing device according to claim 8, wherein the at least one processor is further configured to output image data related to a part of the plurality of frame images within the output target region.

12. The image processing device according to claim 8, further comprising:

an imaging unit configured to capture the plurality of frame images, wherein the at least one processor is further configured to acquire the plurality of frame images captured by the imaging unit.

13. An image processing device comprising:

at least one processor configured to:

set, as a range for which image data is output, in a position in a central part of a frame image region related to a plurality of frame images, an output target region smaller than the frame image region;

set an out-of-frame monitor region to be a target for detecting a subject in a position deviated in a predetermined direction from the central part, in a part of the frame image region outside the output target region; and set the out-of-frame monitor region in a position not in contact with an outer periphery of the output target region.

14. The image processing device according to claim 13, wherein the at least one processor is further configured to set the out-of-frame monitor region in a position in contact with an outer side of the frame image region.

15. The image processing device according to claim 13, wherein the at least one processor is further configured to set the out-of-frame monitor region in a position in contact with an outer periphery of the output target region.

16. The image processing device according to claim 13, wherein the at least one processor is further configured to output image data related to a part of the plurality of frame images within the output target region.

17. The image processing device according to claim 13, further comprising:

an imaging unit configured to capture the plurality of frame images, wherein the at least one processor is further configured to acquire the plurality of frame images captured by the imaging unit.

* * * * *